United States Patent
Cui et al.

(10) Patent No.: US 7,817,315 B2
(45) Date of Patent: Oct. 19, 2010

(54) METHOD FOR ADJUSTING A CONTROLLER OF A SCANNER

(75) Inventors: Chengwu Cui, Lexington, KY (US); Mark Lane Mayberry, Nicholasville, KY (US); Karl Mark Thompson, Midway, KY (US)

(73) Assignee: Lexmark International, Inc., Lexington, KY (US)

( * ) Notice: Subject to any disclaimer, the term of this patent is extended or adjusted under 35 U.S.C. 154(b) by 496 days.

(21) Appl. No.: 11/958,563

(22) Filed: Dec. 18, 2007

(65) Prior Publication Data

US 2009/0153698 A1    Jun. 18, 2009

(51) Int. Cl.
*H04N 1/00* (2006.01)
*H04N 1/46* (2006.01)

(52) U.S. Cl. .................... 358/504; 358/406; 358/474

(58) Field of Classification Search .............. 358/1.9, 358/406, 504, 474
See application file for complete search history.

(56) References Cited

U.S. PATENT DOCUMENTS 5,194,966 A * 3/1993 Quardt et al. ............ 358/406
6,327,047 B1 * 12/2001 Motamed ................. 358/1.15

* cited by examiner

*Primary Examiner*—Kimberly A Williams

(57) ABSTRACT

A method for adjusting a controller of a scanner includes obtaining a scan of a predefined image. The method further includes moving the sensor-element signals of the control signal pattern generated by the controller earlier in the pattern by at least one unit and obtaining an additional scan. The obtaining and moving are repeated until a comparison of a latest additional scan to the image is worse than a comparison of a second-latest additional scan to the image. Another method obtains a noise-reducing heuristic which modifies a time parameter of a sensor-element signal. A set of repeated scans of a same scan line is obtained, noise is measured there from, the time parameter is modified by one predetermined unit, and the process repeats until the noise measured from the latest set of repeated scans is worse than that from the second-latest set of repeated scans.

20 Claims, 4 Drawing Sheets

METHOD FOR ADJUSTING A CONTROLLER OF A SCANNER

TECHNICAL FIELD

The present invention relates generally to scanners, and more particularly to a method for adjusting a controller of a scanner.

BACKGROUND OF THE INVENTION

Scanners are used to scan an image to create a scanned image which can be displayed on a computer monitor, which can be used by a computer program, which can be printed, which can be faxed, etc. One conventional high-speed scanner includes a scan bar, an ASIC (application specific integrated circuit) controller, and a cable operatively interconnecting the controller and the scan bar. The scan bar includes a linear array of sensor (i.e., optical sensor) elements (such as CCD [charge-coupled-device] elements) substantially-aligned along the fast-scan axis. Each sensor element produces a signal proportional to the amount of light reaching the element.

In this conventional scanner, at time of scanner manufacture, the controller is adapted to generate a pattern of control signals including single-sensor control signals based upon the predetermined time delay for the single-sensor control signals to be sent from the controller through the cabling system (i.e., the cable and associated components such as shielding and connectors) to the scan bar. This scanner requires very tight manufacturing controls to be placed on the cabling system so that the cable system-induced time delay of the control signals will be the same for each manufactured scanner.

In this conventional scanner, at time of scanner manufacture, the controller is adapted to generate the single-sensor control signals to extract an analog output from each of the sensor elements based upon an analysis of the performance of a plurality of scanners. Such single-sensor control signals include a phase-clock high signal, a sensor-element reset signal, a sensor-element clamp signal, a sensor-element reference sample signal, and a sensor-element video sample signal. The same single-sensor control signals are used for each of the sensor elements of the scan bar.

What is needed is an improved method for adjusting a controller of a scanner.

SUMMARY OF THE INVENTION

A first exemplary method of the present invention is for adjusting a controller of a scanner. The scanner includes a scan bar having sensor elements a cabling system operatively interconnecting the controller and the scan bar, and a predefined image. The controller is adapted to generate a pattern of control signals including sensor-element signals without considering the amount of time the control signals will take to be sent over the cabling system. The controller is also adapted to send the control signals over the cabling system. The control signals of the pattern are updated for each unit of a predetermined update time. The first method includes obtaining a scan of the predefined image and moving the sensor-element signals earlier in the pattern by at least one unit. The first method also includes obtaining an additional scan of the predefined image with the sensor-element signals moved earlier in the pattern by the at least one unit. The first method may also include repeating the moving of the sensor-element signals and the obtaining of an additional scan until a comparison of a latest additional scan of the predefined image to the predefined image is worse than a comparison of a second-latest additional scan of the predefined image to the predefined image. Once the comparison is completed, the controller may be modified to acquire future scans of images with the sensor-element signals moved earlier in the pattern by a number of units corresponding to the second-latest additional scan of the predefined image.

A second exemplary method of the present invention adjusts a controller of a scanner. The scanner includes a scan bar having a substantially linear array of sensor elements each having an analog output. The controller is adapted to generate sensor-element signals for each sensor element in order to extract the analog output of each sensor element based on a plurality of scanners. The second method includes obtaining at least one noise-reducing heuristic for modifying at least one time parameter of at least one of the sensor-element signals and obtaining a set of repeated scans of a same scan line of an image. The second method also includes measuring noise of the plurality of sensor elements using at least the extracted analog outputs of each sensor element from the set of repeated scans. The method also includes modifying the at least one time parameter of the at least one of the sensor-element signals corresponding to one of the at least one heuristic by one predetermined unit and obtaining an additional set of repeated scans of the same scan line of the image using the modified sensor-element signals. The method further includes measuring noise of the plurality of sensor elements using at least the extracted analog outputs of each sensor element from the additional set of repeated scans. The second method may include repeating the modifying, the obtaining of an additional set of repeated scans and the measuring of noise until the noise measurement from the latest additional set of repeated scans is worse than the noise measurement from the second-latest set of additional repeated scans. The method may also include repeating the modifying, the obtaining of an additional set of repeated scans and the measuring of noise until the noise measurement from the latest additional set of repeated scans is worse than the noise measurement from the second-latest set of additional repeated scans for each of the other of the at least one heuristic. The method may further include modifying the controller to acquire future scans of images with the at least one time parameter of the at least one of the sensor-element signals corresponding to each heuristic modified by a number of units corresponding to the second-latest additional set of repeated scans of the corresponding heuristic.

A third exemplary method of the present invention is another expression of the second method for adjusting a controller of a scanner. The scanner includes a scan bar having a substantially-linear array of sensor elements each having an analog output. The controller is adapted to generate sensor-element signals for each sensor element to extract the analog output of each sensor element based upon a plurality of scanners. The third method includes obtaining a noise-reducing heuristic which modifies a time parameter of one of the sensor-element signals and obtaining a set of repeated scans of a same scan line of an image. The third method also includes measuring noise of the plurality of sensor elements using at least the extracted analog outputs of each sensor element of the set of repeated scans and modifying the time parameter of the one of the sensor-element signals by one predetermined unit and repeating the obtaining of a set of repeated scans and the measuring of noise. The method may also include repeating the modifying of the time parameter, the obtaining a set of repeated scans, and the measuring of noise until noise measurement from the latest set of repeated scans is worse than the noise measurement from the second-latest set of repeated scans. The method may further include modifying the controller to acquire future scans of images with the time parameter modified by a number of units corresponding to the second-latest additional set of repeated scans.

Several benefits and advantages are derived from the first, second and/or third method of the present invention. In one example, the first method automatically adjusts the controller of a high-speed scanner for the cabling system-induced time delay of the sensor-element signals and does so regardless of a lack of manufacturing uniformity in the cabling system, which allows for the use of greater tolerances in less expensive cabling system components. In one example, the second method optimizes the performance of a scanner based on the behavior of that scanner and not on an average optimization of a plurality of scanners at time of manufacture, and such optimization can be repeated at later times to automatically account for degradation over time in scanner-component performance.

DETAILED DESCRIPTION

Figure 1:
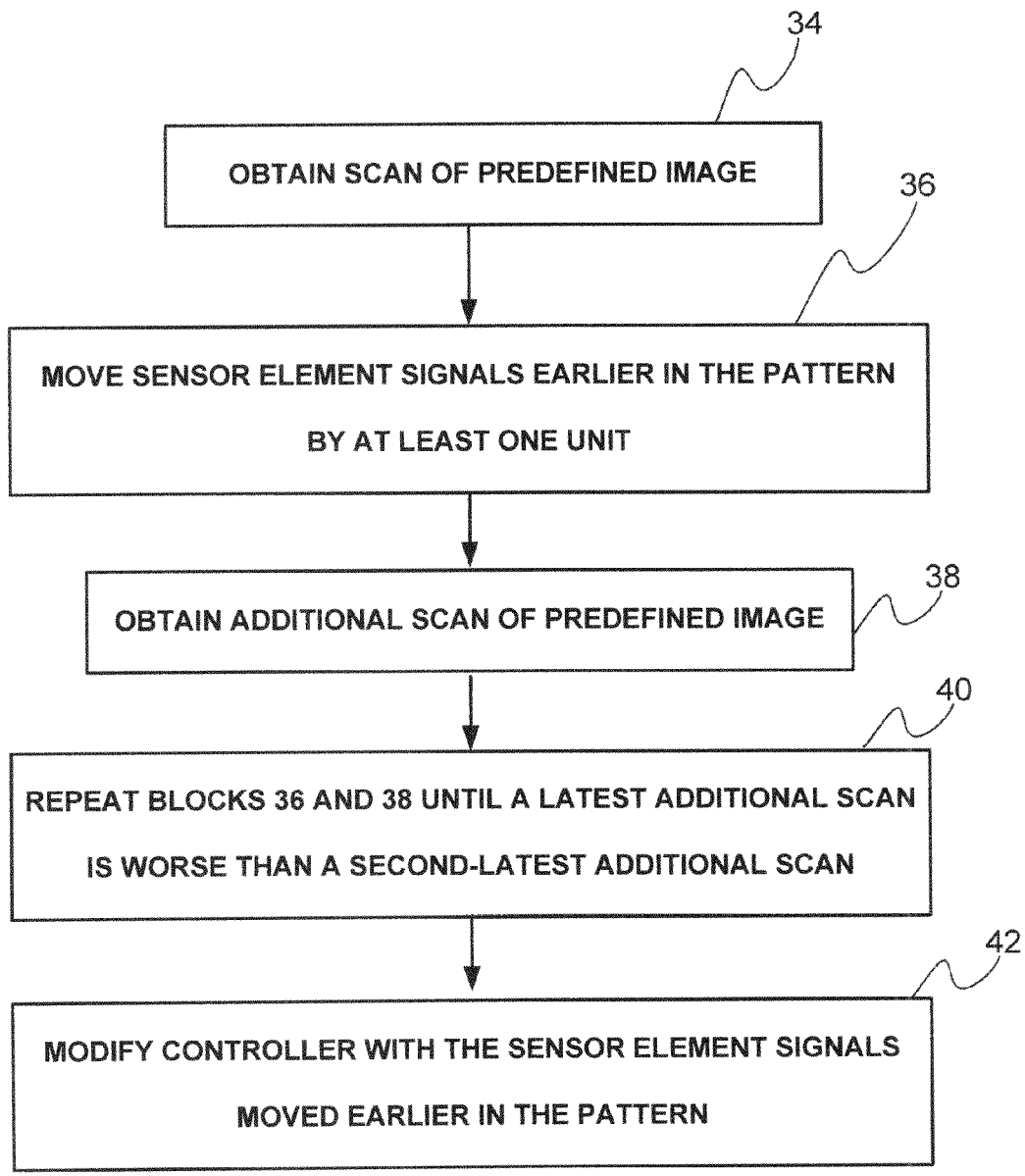
FIG. 1 is a block diagram of a first method of the present invention.
Figure 2:
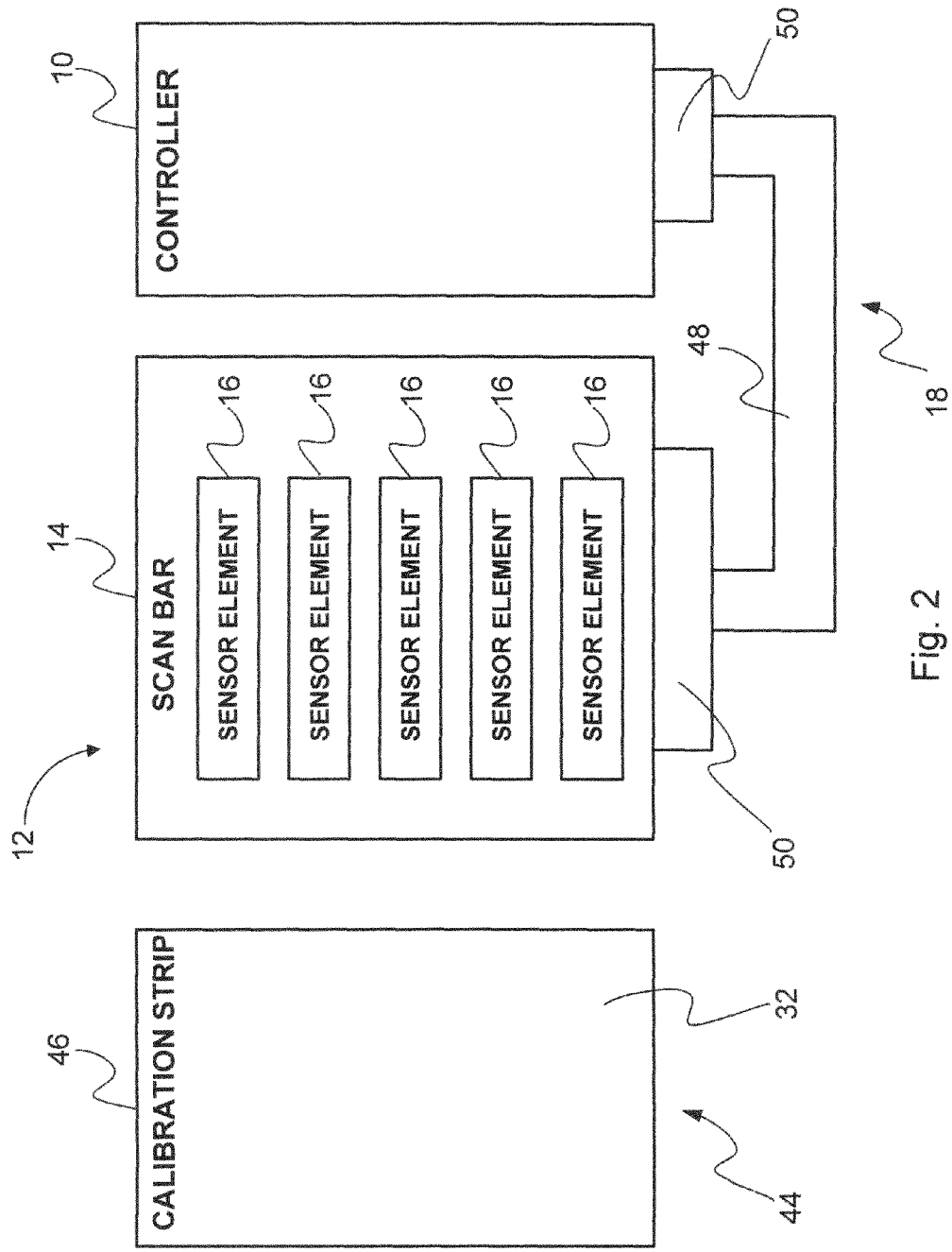
FIG. 2 is a schematic diagram of an embodiment of a scanner which may be employed in performing the first, second and/or the third method of the present invention.
Figure 3:
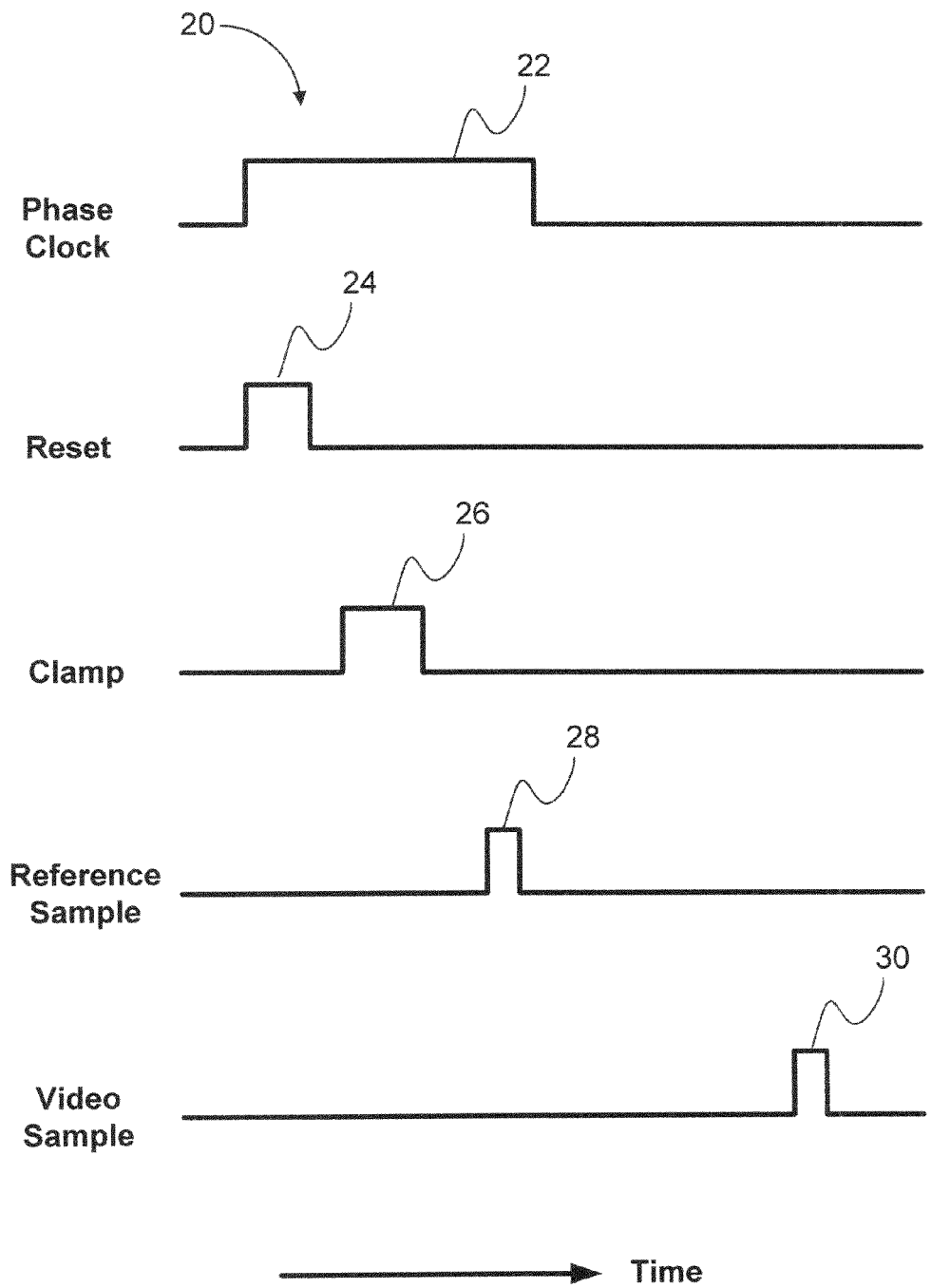
FIG. 3 is a schematic diagram of an example of a pattern of control signals, in the form of sensor-element signals, generated by the controller of the scanner of FIG. 2.

A first exemplary method of the present invention, with reference to FIGS. 1 to 3, is for adjusting a controller 10 of a scanner 12. The scanner 12 includes a scan bar 14 having a plurality of sensor elements 16, a cabling system 18 operatively interconnecting the controller 10 and the scan bar 14, and a predefined image 32. The controller 10 is adapted to generate a pattern (see FIG. 3) of control signals 20, including single-sensor element control signals 22, 24, 26, 28 and 30 without considering the time the control signals 20 will take to be sent over the cabling system 18. The controller 10 is adapted to send the control signals 20 over the cabling system 18. The control signals 20 of the pattern, as shown in FIG. 3, are updated for each unit of a predetermined update time.

The first method includes obtaining a scan of the predefined image 32 using the scan bar 14 with the controller 10 generating the control signals 20 (block 34 of FIG. 1). At block 36, labeled as "Move Sensor-Element Signals Earlier In The Pattern By At Least One Unit", the sensor-element signals 22, 24, 26, 28, 30 are moved earlier in the pattern by at least one unit. At block 38, labeled as "Obtain Additional Scan of Predefined Image", an additional scan of the predefined image 32 is obtained using the scan bar 14 with the controller 10 generating the control signals 20 with the sensor-element signals 22, 24, 26, 28, 30 moved earlier in the pattern by the at least one unit.

The functions performed at blocks 36 and 38 of the first exemplary method are repeated until a comparison of a latest additional scan of the predefined image 32 to the predefined image 32 is worse than a comparison of a second-latest additional scan of the predefined image 32 to the predefined image 32 (block 40). At block 42, labeled "Modify Controller with the Sensor-Element Signals Moved Earlier in the Pattern", the controller 10 may be modified to acquire future scans of images using the scan bar 14 with the controller 10 generating sensor-element signals 22, 24, 26, 28, 30 moved earlier in the pattern by a number of units corresponding to the second-latest additional scan of the predefined image 32.

It is noted that sensor element is to be understood as an optical sensor element such as, but not limited to a CCD (charge-coupled-device) element. It is also noted that the term the "sensor elements", as used herein, need not include every sensor element of the scan bar. In one example, outlying sensor elements and/or defective sensor elements are not included, as can be appreciated by those skilled in the art. It is further noted that the controller 10 may generate the control signals 20 without considering the time the control signals 20 will take to be sent over the cabling system 18.

The sensor element signals 22, 24, 26, 28, 30 are single-sensor element control signals sent by the controller 10 through the cabling system 18 to the scan bar 14. Examples of sensor element signals 22, 24, 26, 28, 30, as shown in FIG. 3, include a sensor-element phase-clock high signal 22, a sensor-element reset signal 24, a sensor-element clamp signal 26, a sensor-element reference sample signal 28, and a sensor-element video sample signal 30. In one example, the sensor elements 16 are arranged in a substantially linear array along the fast axis of scan bar 14. Typically, a scan bar 14 contains several thousands of such sensor elements 16. An example of a non-sensor element signal (not shown) sent by the controller is a signal relating to the scan bar "reading" another scan line of an image after relative movement of the scan bar and the image along the slow axis of the scan bar. An example of a signal (not shown) sent by the scan bar to the controller over the cabling system is an analog output of a sensor element.

In one enablement of the first method, the method is performed when the scanner 12 is manufactured. In the same or a different enablement, the controller 10 may not be modified to move the control signals 20 which are not sensor-element signals 22, 24, 26, 28, 30 earlier in the pattern. In one example, the predetermined update time is based upon the system clock and is in the general range of one to ten nanoseconds.

In one implementation of the first method, the comparison of each scan of the predefined image 32 to the predefined image 32 is a noise comparison. In one variation, the noise comparison is obtained by taking a standard deviation of a selected flat field area of the predefined image 32. In one example, the light levels read by a sensor element 16 for the scan lines of a scan of the selected flat field area are compared to the predetermined light level of such area of the predefined image 32, and a standard deviation for the read light levels of the sensor element 16 is calculated. This is repeated for other sensor elements 16 of the scan bar 14. The standard deviation for the read light levels of the sensor elements 16 of the scan bar 14 are averaged to calculate the standard deviation of the scan, and the average is used to determine if one scan is worse than another scan.

In one embodiment of the first method, the controller 10 is a scanner ASIC (application specific integrated circuit), and the sensor elements 16 are photoelectric cells. In the same or a different embodiment, the controller 10 is modified by saving in non-volatile storage the number of units of time and instructing the controller 10 to generate the control signals 20 with the sensor element signals 22, 24, 26, 28, 30 moved earlier in the pattern by the stored number of units.

In one arrangement of the first method, the scanner 12 includes a predetermined location 44 containing the predefined image 32. This arrangement includes moving the scan bar 14 to the predetermined location 44. In one variation, the predefined image 32 is a scanner calibration strip 46. In one modification, the scanner calibration strip 46 is a white calibration strip.

In one employment of the first method, the cabling system 18 has a delay of at least ten nanoseconds. In one example, the cabling system includes a cable 48 and associated components, such as shielding and connectors 50 for operatively coupling the cable 48 to the controller 10 and to the scan bar 14.

Figure 4:
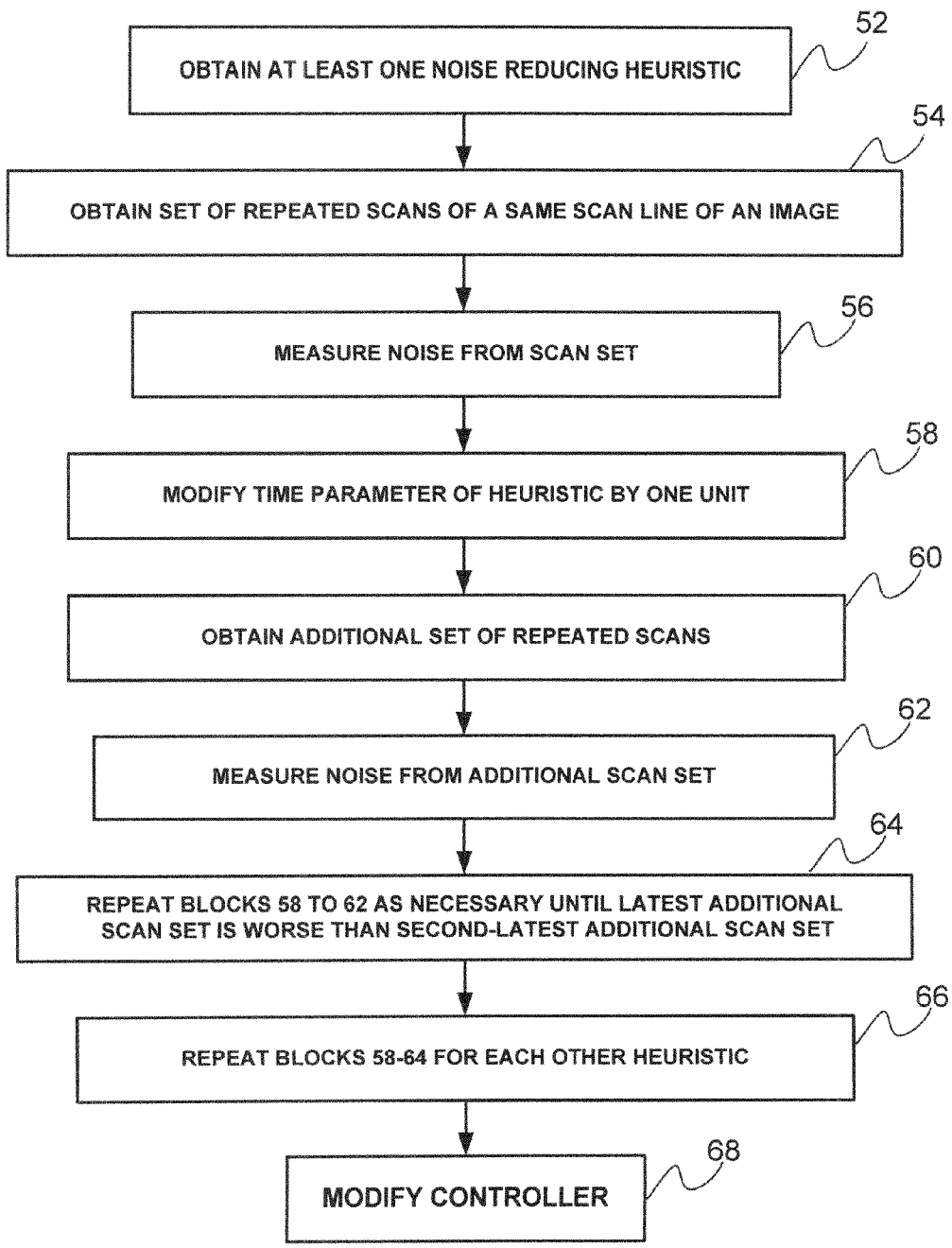
FIG. 4 is a block diagram of a second method of the present invention.

A second exemplary method of the present invention, with reference to FIGS. 2 through 4, is for adjusting a controller 10 of a scanner 12. The scanner 12 includes a scan bar 14 having a substantially linear array of sensor elements 16 each having an analog output. The controller 10 is adapted to generate sensor element signals 22, 24, 26, 28, 30 for each sensor element 16 to extract the analog output of each sensor element 16 based upon a plurality of scanners (such as, but not limited to, the same model scanner). The sensor element signals 22, 24, 26, 28, 30 include a sensor-element phase-clock high signal 22, a sensor-element reset signal 24, a sensor-element clamp signal 26, a sensor-element reference sample signal 28, and a sensor-element video sample signal 30.

Referring to FIG. 4, the second illustrative method includes obtaining at least one noise-reducing heuristic for modifying at least one time parameter of at least one of the sensor-element signals 22, 24, 26, 28, 30 at block 52 (labeled "Obtain at Least One Noise Reducing Heuristic"). At block 54, labeled "Obtain Set of Repeated Scans of a Same Scan Line of an Image", a set of repeated scans of a same scan line of an image (e.g., predefined image 32) using the scan bar 14 with the controller 10 generating the sensor-element signals 22, 24, 26, 28, 30 is obtained. Noise of the plurality of sensor elements 16 is measured (block 56) using at least the extracted analog outputs of each sensor element 16 from the set of repeated scans.

The second method also includes modifying the at least one time parameter of the at least one of the sensor element signals 22, 24, 26, 28, 30 corresponding to one of the at least one heuristic by one predetermined unit (block 58), and at block 60, obtaining an additional set of repeated scans of the same scan line of the image (e.g., predefined image 32) using the scan bar 14 with the controller 10 generating the modified sensor element signals 22, 24, 26, 28, 30. At block 62, noise of the plurality of sensor elements 16 is measured using at least the extracted analog outputs of the each sensor element 16 from the additional set of repeated scans.

The second method may also include repeating the modifying, the obtaining an additional set of repeated scans, and the measuring of noise until the noise measured from the latest additional set of repeated scans is worse than the noise measured from the second-latest set of additional repeated scans (block 64). The method may also include repeating the modifying, the obtaining an additional set of scans, and the measuring of noise until the noise measured is worse than the noise measured from the second-latest set of additional repeated scans for each of the other of the at least one heuristic (block 66). At block 68, the controller 10 is modified to acquire future scans of images using the scan bar 14 with the controller 10 generating the sensor element signals 22, 24, 26, 28, 30 for each sensor element 16 with the at-least-one time parameter of the at-least-one of the sensor-element signals 22, 24, 26, 28, 30 corresponding to each heuristic modified by a number of units corresponding to the second-latest additional set of repeated scans of the corresponding heuristic.

In one example of the second method, the at least one heuristic includes a first heuristic which includes decreasing a duration of the sensor-element reset signal 24 and increasing a duration of the sensor-element clamp signal 26 which helps reduce noise caused by a low video level. In the same or a different example, the at least one heuristic includes a second heuristic which includes increasing a duration of the sensor-element reset signal 24 and reducing a duration of the sensor-element clamp signal 26 which helps reduce noise caused by a high video level. In one illustration, the first and second heuristics may not be used together in the same enactment of the second method.

In the same or a different example, the at least one heuristic includes a third heuristic which includes increasing a delay between the sensor-element reset signal 24 and the sensor-element clamp signal 26 which helps reduce noise by improving the ability to hit the clamp level. In the same or a different example, the at least one heuristic includes a fourth heuristic which includes setting the sensor-element reference sample signal 28 to a predefined minimum duration and starting the sensor-element reference sample signal 28 sooner which helps reduce noise by establishing an earliest time the reference level of the analog output signal is valid.

In the same or a different example, the at least one heuristic includes a fifth heuristic which includes increasing a duration of the sensor-element reference sample signal 28 which helps reduce system noise during reference sampling. In the same or a different example, the at least one heuristic includes a sixth heuristic which includes decreasing a duration of the sensor-element clamp signal 26 and increasing a time-centered duration of the sensor-element reference sample signal 28 which helps reduce system noise during reference sampling. In one illustration, the fifth and sixth heuristics may not be used together in the same enactment of the second method.

In the same or a different example, the at least one heuristic includes a seventh heuristic which includes decreasing a duration of the sensor-element phase-clock high signal 22 and decreasing a duration of the sensor-element clamp signal 26 which helps reduce system noise from sampling the video level too early. In the same or a different example, the at least one heuristic includes an eighth heuristic which includes setting the sensor-element video sample signal 30 to a predefined minimum duration and starting the sensor-element video sample signal 30 sooner which helps reduce noise by establishing the earliest time the reference level of the video signal is valid. In the same or a different example, the at least one heuristic includes a ninth heuristic which includes increasing a duration of the sensor-element video sample signal 30 which helps reduce system noise during video sampling.

It is noted that describing a heuristic as, for example, the seventh heuristic does not mean that the at least one heuristic must include, for example, any one or more of the earlier-numbered heuristics. It is also noted that the time parameters in the above-described heuristics include, for example, the time duration of a signal and the time when a signal starts. An example of modifying a time parameter by one predetermined unit is increasing the duration of a signal by one unit of time equal to the update time (or a multiple thereof) in order for the controller 10 to update the sensor element signals 22, 24, 26, 28, 30. In one illustration, the update time is based on the system clock and is in the general range of one to ten nanoseconds.

In one embodiment of the second method, the number of units corresponding to the second-latest additional set of repeated scans for each heuristic is saved in non-volatile storage, and the controller 10 is instructed to generate the sensor-element signals 22, 24, 26, 28, 30 for each sensor element 16 with the at least one time parameter of the at least one of the sensor-element signals 22, 24, 26, 28, 30 corresponding to each heuristic modified by the stored number of units.

In one variation of the second method, the measure of noise is obtained by calculating a standard deviation. In one example, the light levels read by a sensor element 16 for a set of repeated scans of the same scan line are used to calculate a standard deviation for the read light levels of that sensor element 16. This is repeated for other sensor elements 16 of the scan bar 14. The standard deviation for the read light levels of the sensor elements 16 of the scan bar 14 are averaged to calculate the standard deviation of the set of repeated scans of the same scan line, and the average is used to determine if the measure of noise from one set of repeated scans of the same scan line is worse than the measure of noise from another set of repeated scans of the same scan line.

Referring back to FIGS. 2 to 4, a third exemplary method of the present invention, which is another expression of the second method, is for adjusting a controller 10 of a scanner 12. The scanner 12 includes a scan bar 14 having a substantially linear array of sensor elements 16 each having an analog output. The controller 10 is adapted to generate sensor-element signals 22, 24, 26, 28 and 30 for each sensor element 16 to extract the analog output of each sensor element 16 based upon a plurality of scanners. The third method includes obtaining a noise-reducing heuristic which modifies a time parameter of one of the sensor-element signals 22, 24, 26, 28, 30. The third method includes obtaining a set of repeated scans of a same scan line of an image using the scan bar 14 with the controller 10 generating the sensor-element signals 22, 24, 26, 28, 30. The method also includes measuring noise of the plurality of sensor elements 16 using at least the extracted analog outputs of each sensor element 16 of the set of repeated scans and modifying the time parameter of the one of the sensor-element signals 22, 24, 26, 28, 30 by one predetermined unit and repeating the obtaining a set of repeated scans and the measuring of noise. The modification of the time parameter, the obtaining of a set of repeated scans and the measuring of noise repeats until the measure of noise from the latest set of repeated scans is worse than the measure of noise from the second-latest set of repeated scans. Then, the controller 10 is modified to acquire future scans of images using the scan bar 14 with the controller 10 generating the one of the sensor-element signals 22, 24, 26, 28, 30 for each sensor element 16 with the time parameter modified by a number of units corresponding to the second-latest additional set of repeated scans.

While the exemplary methods described herein are illustrated with single-sensor systems, it will be appreciated by one of ordinary skill in the art that the present invention may be applied to multi-sensor systems. In such multi-sensor systems, the present invention may be applied to each sensor by iteration.

Several benefits and advantages are derived from the first, second and/or third method of the present invention. In one example, the first method automatically adjusts the controller of a high-speed scanner for the cabling system-induced time delay of the sensor-element signals and does so regardless of a lack of manufacturing uniformity in the cabling system allowing for the use of greater tolerances in less expensive cabling system components. In one example, the second method optimizes the performance of a scanner based on the behavior of that scanner and not on an average optimization of a plurality of scanners at time of manufacture. Such optimization can be repeated at later times to automatically account for degradation over time in scanner-component performance.

The foregoing description of several exemplary methods of the present invention has been presented for purposes of illustration. It is not intended to be exhaustive or to limit the present invention to the precise actions and/or forms disclosed, and obviously many modifications and variations are possible in light of the above teaching. It is intended that the scope of the present invention be defined by the claims appended hereto.

What is claimed is:

1. A method for adjusting a controller of a scanner, wherein the scanner includes a scan bar having sensor elements, a cabling system operatively interconnecting the controller and the scan bar, and a predefined image and wherein the controller is adapted to generate a pattern of control signals including sensor-element signals without considering the amount of time the control signals will take to be sent over the cabling system and to send the control signals over the cabling system, wherein the control signals of the pattern are updated for each unit of a predetermined update time, comprising:
    obtaining a scan of the predefined image;
    moving the sensor-element signals earlier in the pattern by at least one unit;
    obtaining an additional scan of the predefined image with the sensor-element signals moved earlier in the pattern by the at least one unit; and
    repeating the moving and the obtaining of an additional scan until a comparison of a latest additional scan of the predefined image to the predefined image is worse than a comparison of a second-latest additional scan of the predefined image to the predefined image; and
    modifying the controller to acquire future scans of images with the sensor-element signals moved earlier in the pattern by the number of units corresponding to the second-latest additional scan of the predefined image.

2. The method of claim 1, wherein the method is performed at the time of scanner manufacture.

3. The method of claim 1, wherein the controller is not modified to move the control signals which are not sensor-element signals earlier in the pattern.

4. The method of claim 1, wherein the comparison of each scan of the predefined image to the predefined image is a noise comparison.

5. The method of claim 4, wherein the noise comparison is obtained by taking a standard deviation of a selected flat field area of the predefined image.

6. The method of claim 1, wherein the controller is an application specific integrated circuit and wherein the sensor elements are photoelectric cells.

7. The method of claim 1, wherein the scanner includes a predetermined location containing the predefined image, and wherein the obtaining of the scan of the predefined image includes moving the scan bar to the predetermined location.

8. The method of claim 1, wherein the predefined image is a white scanner calibration strip.

9. The method of claim 1, wherein the cabling system has a delay of at least ten nanoseconds.

10. A method for adjusting a controller of a scanner, wherein the scanner includes a scan bar having a substantially linear array of sensor elements each having an analog output, wherein the controller is adapted to generate sensor-element signals for each sensor element in order to extract the analog output of each sensor element based on a plurality of scanners, comprising:
    obtaining at least one noise-reducing heuristic for modifying at least one time parameter of at least one of the sensor-element signals;

obtaining a set of repeated scans of a same scan line of an image;

measuring noise of the sensor elements using at least the extracted analog outputs of each sensor element from the set of repeated scans;

modifying the at least one time parameter of the at least one of the sensor-element signals corresponding to one of the at least one heuristic by one predetermined unit;

obtaining an additional set of repeated scans of the same scan line of the image using the sensor-element signals;

measuring noise of the plurality of sensor elements using at least the extracted analog outputs of the each sensor element from the additional set of repeated scans;

repeating the modifying, the obtaining of an additional set of repeated scans and the measuring of noise until the noise measurement from the latest additional set of repeated scans is worse than the measure of noise from the second-latest set of additional repeated scans;

repeating the modifying, the obtaining of an additional set of repeated scans and the measuring of noise until the noise measurement from the latest additional set of repeated scans is worse than the measure of noise from the second-latest set of additional repeated scans for each of the other of the at-least-one heuristic; and modifying the controller to acquire future scans of images with the at least one time parameter of the at least one of the sensor-element signals corresponding to each heuristic modified by a number of units corresponding to the second-latest additional set of repeated scans of the corresponding heuristic.

11. The method of claim 10, wherein the at least one heuristic includes decreasing a duration of a sensor-element reset signal and increasing a duration of a sensor-element clamp signal.

12. The method of claim 10, wherein the at least one heuristic includes increasing a duration of a sensor-element reset signal and decreasing a duration of a sensor-element clamp signal.

13. The method of claim 10, wherein the at least one heuristic includes increasing a delay between a sensor-element reset signal and a sensor-element clamp signal.

14. The method of claim 10, wherein the at least one heuristic includes setting a sensor-element reference sample signal to a predefined minimum duration and starting the sensor-element reference sample signal sooner.

15. The method of claim 10, wherein the at least one heuristic includes increasing a duration of a sensor-element reference sample signal.

16. The method of claim 10, wherein the at least one heuristic includes decreasing a duration of a sensor-element clamp signal and increasing a time-centered duration of a sensor-element reference sample signal.

17. The method of claim 10, wherein the at least one heuristic includes decreasing a duration of a sensor-element phase-clock high signal and decreasing a duration of a sensor-element clamp signal.

18. The method of claim 10, wherein the at least one heuristic includes setting a sensor-element video sample signal to a predefined minimum duration and starting the sensor-element video sample signal sooner.

19. The method of claim 10, wherein the at least one heuristic includes increasing a duration of a sensor-element video sample signal.

20. A method for adjusting a controller of a scanner, wherein the scanner includes a scan bar having a substantially linear array of sensor elements each having an analog output, wherein the controller is adapted to generate sensor-element signals for each sensor element to extract the analog output of each sensor element based upon a plurality of scanners, comprising:

obtaining a noise-reducing heuristic which modifies a time parameter of one of the sensor-element signals;

obtaining a set of repeated scans of a same scan line of an image;

measuring noise of the plurality of sensor elements using at least the extracted analog outputs of each sensor element of the set of repeated scans;

modifying the time parameter of the one of the sensor-element signals by one predetermined unit and repeating the obtaining a set of repeated scans and the measuring of noise;

repeating the modifying of the time parameter, the obtaining a set of repeated scans and the measuring of noise until the noise from the latest set of repeated scans is worse than the noise measurement from the second-latest set of repeated scans; and modifying the controller to acquire future scans of images with the time parameter modified by a number of units corresponding to the second-latest additional set of repeated scans.

* * * * *